United States Patent
Lee et al.

(10) Patent No.: US 10,617,138 B2
(45) Date of Patent: Apr. 14, 2020

(54) METHOD FOR MANUFACTURING A FISH SAUCE AND A FISH SAUCE MANUFACTURED BY THE SAME

(71) Applicant: CJ CHEILJEDANG CORPORATION, Seoul (KR)

(72) Inventors: Ho Woo Lee, Seoul (KR); Ji Young Oh, Seongnam-si (KR); Dae Ik Kang, Goyang-si Gyeonggi-do (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 0 days.

(21) Appl. No.: 14/439,583

(22) PCT Filed: Nov. 28, 2014

(86) PCT No.: PCT/KR2014/011537
§ 371 (c)(1),
(2) Date: Apr. 29, 2015

(87) PCT Pub. No.: WO2015/080511
PCT Pub. Date: Jun. 4, 2015

(65) Prior Publication Data
US 2016/0066613 A1  Mar. 10, 2016

(30) Foreign Application Priority Data
Nov. 29, 2013 (KR) ........................ 10-2013-0148027

(51) Int. Cl.
| | | |
|---|---|---|
| A23L 23/00 | (2016.01) | |
| A23B 4/023 | (2006.01) | |
| A23B 4/20 | (2006.01) | |
| A23B 4/24 | (2006.01) | |
| A23L 17/00 | (2016.01) | |
| A23L 27/24 | (2016.01) | |

(52) U.S. Cl.
CPC .............. *A23L 23/00* (2016.08); *A23B 4/023* (2013.01); *A23B 4/20* (2013.01); *A23B 4/24* (2013.01); *A23L 17/00* (2016.08); *A23L 27/24* (2016.08); *A23V 2002/00* (2013.01)

(58) Field of Classification Search
CPC ... A23L 1/325; A23L 1/39; A23L 1/23; A23B 4/023; A23B 4/20
USPC ......................................................... 426/18
See application file for complete search history.

(56) References Cited

FOREIGN PATENT DOCUMENTS

| | | |
|---|---|---|
| JP | S5596073 A | 7/1980 |
| JP | 2002051724 A | 2/2002 |
| JP | 2002176951 | 6/2002 |
| JP | 2003102422 | 4/2003 |
| JP | 2004313138 A | 11/2004 |
| JP | 2011120484 A | 6/2011 |
| JP | 2013208071 | 10/2013 |
| KR | 900002395 | 4/1990 |
| KR | 940002864 | 4/1994 |
| KR | 20010019368 | 3/2001 |
| KR | 20010044107 | 6/2001 |
| KR | 20020085076 | 11/2002 |
| KR | 20120000500 | 1/2012 |
| KR | 20120097650 | 9/2012 |
| WO | 2007026871 A1 | 8/2007 |
| WO | 2008120598 A1 | 10/2008 |

OTHER PUBLICATIONS

Chae, S-K. et al., 1989. Korean J. Food Sci. Technol. 21: 639-648.*
Nam, D. H. et al., 2011. J Food Sci. 76: H194-H200.*
Luh, B. S. J. Ind. Microbiol. 14: 467-471 (1995).*
Cho, S-J. et al. 2007. J. Agric. Food Chem. 55: 10599-10604 (Year: 2007).*
Lee, S. S. Korean J. Mycol. 23: 161-175 (1995) (Year: 1995).*
International Search Report for PCT/LR2014/011537, English translation attached to original, Both completed by the European Patent Office dated Mar. 24, 2015, All together 5 Pages.
Japanese Office Action issued in corresponding JP 2015-550350; dated Mar. 8, 2016; 5 pages.
Japanese Final Office Action for Japanese Application No. JP2015-550350, dated Oct. 17, 2017, 6 Pages.
Korean Office Action for Korean Application No. 10-2013-0148027, Issued by the Koran Patent Office dated Jun. 22, 2016, 6 Pages.

* cited by examiner

*Primary Examiner* — Hamid R Badr
(74) *Attorney, Agent, or Firm* — Brooks Kushman P.C.

(57) ABSTRACT

A method for manufacturing a high-flavor fish sauce within a short period and a fish sauce manufactured by the same. The method for manufacturing the fish sauce can considerably reduce the conventional long fermentation and maturation period of from 1 to 3 years, improve the nutrient content and taste of the fish sauce due to a hybrid, remove the intrinsic fishy odor therefrom, enhance its sensory desirability and quality thus being highly competitive to be widely used in the fish sauce manufacturing industry.

8 Claims, 1 Drawing Sheet

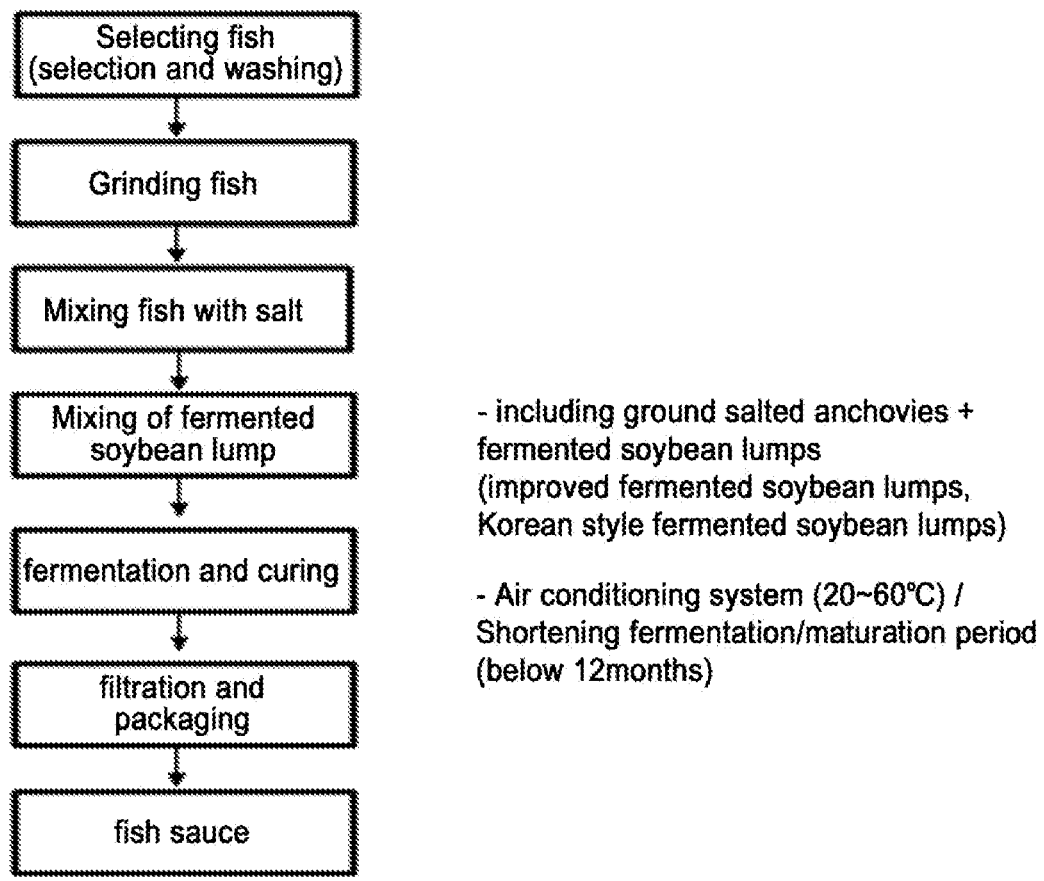

METHOD FOR MANUFACTURING A FISH SAUCE AND A FISH SAUCE MANUFACTURED BY THE SAME

CROSS-REFERENCE TO RELATED APPLICATION

This application is the U.S. national phase of PCT Application No. PCT/KR2014/011537 filed on Nov. 28, 2014, which claims priority to KR Patent Application No. 10-2013-0148027 filed on Nov. 29, 2013, the disclosures of which are incorporated in their entirety by reference herein.

TECHNICAL FIELD

The present invention relates to a method for manufacturing a high-flavor fish sauce within a short period, and a fish sauce manufactured by the same.

BACKGROUND ART

Generally, 'jeotgal', a salted sea food containing fish sauces, is part of the traditional Korean fermented foods which have been used as materials for preparing Korean foods. In Korea, most marine products are utilized as fermented sea foods, being salted and fermented to be used as seasonings or subsidiary raw materials for making kimchi. Marine fermented sea foods usually refer to those prepared by adding a large amount of salt followed by fermentation and maturation through decomposition of protein raw materials by the activity of the protease contained therein, and the fish sauce refers to a juice separated from the fish sauce after fermenting for a longer period.

Jeotgals and fish sauces manufactured using marine products can provide a deep and savory taste due to maturation by enzymatic activity along with the unique flavor of the fish itself, and are usually used as seasonings for appetizers. In fact, they are used as subsidiary raw materials for making a seaweed soup, seasoned zucchini, and kimchi. In Korea, various kinds of jeotgals are manufactured depending on the part of the country, and also various kinds of kimchi prepared using the same are available. Recently, with the globalization of food materials, fish sauces are being imported as food materials from overseas, including from Southeast Asian countries.

Conventional fish sauces contain water, salt, and a small amount of amino acids, nitrogen, and calcium. An anchovy fish sauce (a representative fish sauce) contains a large amount of various amino acids, including glutamic acid, aspartic acid, glycine, alanine, lysine, etc., and taste compounds, such as nucleic acids, and thus it has been widely used in seasoning foods such as kimchies (whole cabbage kimchi, young radish kimchi, leaf mustard kimchi, etc.) and grilled foods.

Traditionally, these fish sauces were mainly manufactured at home and consumed in a self-sufficient manner, but nowadays they are being produced in large-scale factories with improved hygiene and storage capacity, and there is a growing demand for the fish sauces.

According to a traditional method for manufacturing the fish sauce, the material of a whole fish is mixed with salt and then put into a tank or container, allowed to ferment for a certain period (at least 24 months), and the resulting juice produced by lysis of the fish proteins is filtered to thereby obtain the fish sauce. Fish sauce manufactured using fish as a raw material, being a natural animal seasoning, has been used as an seasoning essential for manufacturing kimchi, and also in cooking a few other foods in Korea and is thus becoming one of the seasonings essential in Korean food culture.

When the fermentation is performed by the traditional method it requires a longer period for fermentation/maturation, during which the anchovy proteins are lysed by the autolytic enzyme contained in the fish, and also decomposed by various microorganisms which can grow in high salt conditions. Generally, fermentation can vary according to the kind and state of the microorganisms involved therein, and the contamination of various bacteria often accompany a foul odor and unpleasant taste.

Recently, there has been an increase in the production of a pacific sand lance sauce, but the pacific sand lance sauce, due to its foul odor and taste, can be used only in foods having a strong smell such as kimchi.

Additionally, because the traditional method requires a long period it cannot secure good productivity and competitiveness thus not being able to accelerate its progress in the related industry. Accordingly, various attempts have been made to shorten the fermentation period of the conventional fish sauces. For example, Korean Patent No. 10-0467500 (Quick fermented liquid Jeotgal using anchovies or lances and process of preparation thereof) suggests a method for manufacturing a fish sauce including adjusting pH, performing a tertiary maturation by adding an enzyme preparation, and sterilization/filtration. Additionally, Korean Patent No. 10-0034142 (method for making salted and soused liquid products from small sardine) discloses a method for manufacturing a fish sauce including adding a calcium salt as an enzyme activity accelerator and a protease to a ground meat, agitating at optimum pH and temperature conditions for 4 hours, and hydrolyzing, sterilizing, cooling, filtering, and adding salt to the filtrate.

SUMMARY

Accordingly, the present inventors, while endeavoring to develop a fish sauce having high quality and flavor with high competitiveness by rapidly manufacturing within a shortened period keeping in mind the above problems occurring in the prior art, discovered that a fish sauce with high quality and flavor can be rapidly manufactured within a short period (15 days-5 months) by a method including mixing ground fish with salt and homogenizing, mixing the homogenate with 'meju', placing the mixture into a sealed container and fermenting/maturating it at a constant temperature under air conditioning environment, thereby decomposing the proteins present in the material derived from a fish by the enzyme contained in the meju and the autolytic enzyme contained in the fish, and furthermore, confirmed that a fish sauce with high quality and flavor can be manufactured even after a relatively longer period (6 months-12 months) of fermentation/maturation by a method including mixing ground fish with salt and homogenizing, mixing the homogenate with meju, placing the mixture into a sealed container and fermenting/maturating at a constant temperature under air conditioning environment, thereby decomposing the proteins present in the material derived from a fish by the enzyme contained in the meju and the autolytic enzyme contained in the fish, thereby completing the present invention.

An objective of the present invention is to provide a method for manufacturing a high-flavor fish sauce within a short period.

Another objective of the present invention is to provide a method for manufacturing a high-flavor fish sauce.

Still another objective of the present invention is to provide a fish sauce manufactured using the method.

Advantageous Effects

The present invention relates to a method for manufacturing a high-flavor fish sauce within a short period and a fish sauce manufactured by the same. The method for manufacturing the fish sauce of the present invention can considerably reduce the conventional long fermentation and maturation period of from 1 to 3 years, improve the nutrient content, and taste of the fish sauce due to a hybrid, remove the intrinsic fishy odor therefrom, enhance its sensory desirability and quality thus being highly competitive and widely used in the fish sauce manufacturing industry.

DESCRIPTION OF DRAWINGS

FIG. 1 is a schematic diagram illustrating a step-wise method for manufacturing a fish sauce according to an embodiment of the present invention.

BEST MODE

In an aspect to accomplish the above objectives, the present invention relates to a method for manufacturing a fish sauce with high flavor.

In particular, the present invention may relate to a method for manufacturing a high-flavor fish sauce within a short period.

Specifically, the present invention relates to a method for manufacturing a fish sauce, including: (a) adding salt to fish or a material derived from a fish, mixing and homogenizing; (b) adding meju to the mixed homogenate obtained from step (a) and mixing them together; and (c) placing the mixture obtained from step (b) into a fermentation container, and fermenting and maturing it at a constant temperature under an air conditioning system for a period from 15 days to 5 months.

Meanwhile, the present invention may relate to a method for manufacturing a high-flavor fish sauce even in the case of long-term fermentation/maturation.

Specifically, the present invention relates to a method for manufacturing a fish sauce, including: (a) adding salt to fish or a material derived from a fish, mixing and homogenizing; (b) adding meju to the mixed homogenate obtained from step (a) and mixing them together; and (c) placing the mixture obtained from step (b) into a fermentation container, and fermenting and maturing it at a temperature from 10° C. to 25° C. under an air conditioning system for a period from 6 months to 12 months.

Specifically, the method for manufacturing a fish sauce of the present invention may further include, before step (a), (i) draining water from washed fish; and (ii) grinding the washed, water-drained fish or not grinding.

As used herein, "fish sauce (aekjeot)" refers to a fermented product of an animal protein and is also called fish paste. Preferably, the animal protein is derived from marine animals. Examples of the marine animals may include fishes, Crustacea, Cephalopods, etc., and may include pacific sand lances, anchovies, horse mackerels, squids, octopuses, mackerel pikes, sardines, tunas, tuna cooking juice, shrimps, tiny shrimps, Japanese ice fish, herrings, gizzard shads, mackerels, *Trachurus japonicas*, *Seriola quinqueradiata*, pond smelts, and a combination thereof, and preferably, anchovies or pacific sand lances, but is not limited thereto.

Currently, there are growing concerns on the globalization and commercialization of traditional Korean foods such as jeotgals and fish sauces, and thus there is a need for a large-scale production of the traditional Korean foods. Additionally, in the case of the fish sauce among the traditional Korean foods, which is used as a basic condiment in making kimchi or various seasoned vegetables is believed to help the globalization of kimchi and also the improvement of its taste accordingly. However, when the fish sauce is manufactured by the traditional method it requires long-term fermentation/maturation for at least one year and is not suitable for a large-scale production, and it thus has a high production and manufacturing cost and a low efficiency. In this regard, the method of manufacturing the fish sauce of the present invention has an advantage that it can reduce the traditional fermentation period into half or less by adding meju.

Conventionally, during the fermentation process in manufacturing fish sauce and jeotgal, the enzyme and bacteria present in the fish and shellfish tissues as raw materials act together along with protease thereby being formed into taste compounds. In general, fish sauces and jeotgals are manufactured via fermentation based on natural maturation. Therefore, the constituting components of the fermentation products can vary depending on the kinds and state of the raw materials used as fermentation bases and also depending on the microorganisms involved in the fermentation/maturation and the mechanism of the acting enzymes involved therein.

The fermentation of the present invention is performed by putting a mixture of fish, salt, and meju into a tank or a container, and allowed to ferment/maturate in an airtight condition. That is, the fermentation process of the present invention is characterized in that it is performed under an air conditioning system where the fermentation container is maintained to prevent air passage. Additionally, unlike the conventional fermentation method requiring a long-term fermentation process by fish protease, the fermentation process of the present invention enables a short term proteolysis of fish proteins by the protease contained in the meju along with the autolytic enzyme contained in the fish. Additionally, the present invention provides a method for manufacturing a fish sauce with improved quality (total nitrogen, TN) over the conventional fish sauces, according to the protein content of the raw materials for the meju. Furthermore, the fish sauce manufactured according to the method of the present invention can provide an improved quality over the conventional fish sauces even when the fish sauce is manufactured through a relatively longer fermentation period.

As used herein, the term "meju" refers to a basic material used for manufacturing soybean paste or red pepper paste, wherein the meju is prepared by inoculation-culturing of meju fungi (*Aspergillus oryzae*) to boiled soybeans or a mixture containing boiled soybeans and a starch material such as flour. Conventionally, the meju has been manufactured using only soybeans, but according to the recent improved methods, flour or seed grains may be additionally added to the soybeans to manufacture the meju. Generally, the meju is manufactured by a method including boiling and crushing soybeans (flour, seed grains, etc., may be also added) into lumps, placing the lumps on top of rice straw and drying for 2-3 days, clumping, then binding, the dried lumps with the rice straw and hanging the straw-bound clumps on a shelf in the mom thereby allowing them to ferment/mature, or alternatively, putting the straw-bound clumps into a large container after spreading rice straw on the bottom of the container, closing the opening with the container lid, and allowing them to mature therein at a constant temperature of from 27° C. to 28° C. for 2 weeks. After drying the resultant in the sunlight, it is put into the container again to be fermented and dried.

In an embodiment of the present invention, 10 kg of soybeans were washed 2-3 times, impurities were selected, and the resultant was immersed in water for 8 hours. Following this immersion, the soybeans were drained of water and boiled via pressure cooking at 100° C. or higher for at least 60 minutes. The boiled soybeans were cooled to between 30° C. and 35° C., and the meju fungal starter (*Aspergillus oryzae*) was inoculated thereto at a concentration of 0.1-1.0%. The resultant was fermented at 25° C.-40° C. for 48 hours to manufacture meju to be used.

The fish sauce manufactured via rapid fermentation using a hot or warm air current exhibited improved taste quality in savory taste, sweetness, and affinity compared to those of the conventional fish sauces thus confirming that there is no difference in taste and nutrient content caused by the rapid fermentation, and the rapid fermentation is expected to upgrade the competitiveness of the traditional Korean fermented seafoods.

The method of manufacturing a fish sauce according to the present invention may be described as follows.

1. Washing Fish

The fish to be used as a raw material is washed 2-3 times. The fish that can be used in the present invention may include, although not limited thereto, anchovies, pacific sand lances, tunas, horse mackerels, gizzard shads, squid liver, squids, tiny shrimps, Japanese ice fish, mackerels, herrings, mackerel pikes, shrimps, pond smelts, *Seriola quinqueradiata*, and preferably, anchovies or pacific sand lances.

The washing may be performed using clean purified water to wash the fish to be used as a raw material for manufacturing a fish sauce, or alternatively, sea water may be used to perform the washing.

2. Removing Water

Upon completion of washing the fish in the above step, the water can be drained off the fish, and preferably, within a short period of 30 minutes or less.

3. Grinding Fish

Upon completion of draining water from the fish in the above step, the fish is sufficiently ground into a size of from 0.5 cm to 1.5 cm using a grinder. Preferably, the grinding mediates an easy reaction between enzymes and microorganisms to thereby ease the lysis of proteins, but it is also possible for the material derived from a fish to be used without being ground.

4. Adding Salt to Fish, Mixing, and Homogenizing

The fish ground in the above step is added with salt, mixed, and homogenized. In particular, the salt is added in the amount from 17% (w/w) to 30% (w/w) relative to the weight of the fish. The addition of salt is to prevent decay of the fish during the fermentation at medium temperature in the subsequent step. That is, when the amount of salt contained is less than 17% (w/w) it is not sufficient to prevent the decay of fish sauce and thus the fish sauce may decay. In contrast, when the amount of salt contained is greater than 30% (w/w) it is too high a salt concentration and thus it will lower the preference as an edible food and may also cause a health problem due to excessive salt intake.

Accordingly, it is preferable that the salt be added in the amount from between 17% (w/w) to 30% (w/w) relative to the weight of the fish to prevent decay while avoiding excessive salt intake. Additionally, both commercially available solar salt and refined salt can be used as the salt of the present invention, and preferably, solar salt from which more than 90% water is removed. The fish and salt may be mixed and homogenized using a screw.

5. Mixing Salted Fish with Meju

The fish uniformly mixed in the above step (homogenized mixture) is added with meju. In particular, the amount of meju to be added may be in the amount of from 1% (w/w) to 30% (w/w) relative to the weight of the fish. The addition of meju is to accelerate the speed of lysis by the protease contained in the meju along with the autolytic enzyme contained in the fish during fermentation at medium temperature.

Additionally, the amino acids of the meju and the amino acids in the fish together provide a more savory taste compound, and the agglutinating activity of meju can eliminate the fishy odor. Due to the heterogeneous binding between the proteins contained in the fish and those in the meju it is possible to produce a high quality fish sauce. For example, the raw materials for manufacturing the meju include beans, wheat, wheat flour, rice, unpolished rice, gelatinized rice, puffed rice, barley, foxtail millet, sorghum, and preferably, beans.

The salted fish is added with the meju, mixed, and homogenized using a screw, and placed into a separate sealed container. The container of the present invention may be selected from the group consisting of a PE tank, a stainless steel tank, an FRP tank, an onggi (Korean earthenware), and a plastic container.

6. Fermentation/Maturation

Upon adding the meju and mixing thereafter, the mixture is subjected to a fermentation/maturation process at medium temperature. In the present invention, the fermentation of the fish sauce is characterized in that it is performed at the medium temperature unlike the conventional method, e.g., from 20° C. to 60° C., preferably from 40° C. to 50° C. In order to maintain the medium temperature a hot or warm air current is used under air an conditioning system.

Additionally, the fermentation at the medium temperature is performed for from 15 days to 1 year, preferably from 15 days to 5 months, and more preferably from 1 month to 3 months. The above length is considerably shorter than the conventional length of period for manufacturing a fish sauce, but there is no difference in terms of nutrient contents and flavor compared to those of the conventional fish sauces. In fact, it was confirmed that the addition of the meju improved the sensory desirability and quality including an increase of protein content, improvement of the savory taste and sweet taste, reduction of the degree of decay, elimination of fishy odor, etc. (Tables 1 through 3).

Additionally, upon adding the meju, the mixture may be subjected to fermentation/maturation at a constant temperature, in particular, at a temperature from between 10° C. to 25° C. for over 6 months to 12 months.

7. Obtaining Filtrate

Subsequently, as an additional step, the precipitate in the fermentation liquid produced in the fermentation/maturation tank was removed and the supernatant was separated and placed thereat, and filtered. The resulting filtrate is used to manufacture a fish sauce according to the present invention. The filtration method to be used in the present invention can be any conventional filtration method used in the art, and preferably, the filtration may be performed by filtrating the fermentation liquid using a 1.0 μm filter.

In an embodiment of the present invention, the fish sauce manufactured according to the conventional method and that manufactured according to the method of the present invention were compared regarding their contents of total nitrogen and amino nitrogen as nutrients. As a result, it was confirmed that, even when the fermentation period was the same, the contents of total nitrogen and amino nitrogen in the fish sauce manufactured according to the present invention were markedly increased (Table 1). Accordingly, the present inventors confirmed that when the fish sauce is manufactured according to the present invention it can considerably reduce the manufacturing time and also remarkably increase its nutrient contents if fermented for the same period.

Additionally, it was confirmed that the fish sauce manufactured according to the present invention, although manufactured within a shorter period than that manufactured by the conventional method, had an excellent flavor. That is, in an embodiment of the present invention, the fish sauce manufactured according to the conventional method and that manufactured according to the method of the present invention were compared regarding their contents of total nitrogen and amino nitrogen as nutrients. As a result, it was confirmed that there was a significant difference between the two fish sauces in terms of sensory evaluation factors such as a salty taste, a savory taste, a fish sauce flavor, overall preferences, etc. The difference is due to the complex flavor from the protein content, carbohydrates, saccharides, etc., of the meju, and the fish sauce of the present invention exhibited improved sensory desirability compared to the conventional fish sauce, due to elimination of the fishy odor unique to the fish sauce, improved savory taste and sweet taste, etc. (Table 2).

That is, when the fish sauce is manufactured according to the present invention it can considerably reduce the manufacturing time and also produce a fish sauce having an excellent flavor quality with improvement over the conventional fish sauce.

Additionally, when the fish sauce is manufactured according to the present invention, a fish sauce of high-flavor quality with a reduced level of unpleasant taste and foul odor can be manufactured even when matured for a long period of from 6 months to 12 months.

In an additional aspect, the present invention provides a fish sauce manufactured by the method for manufacturing a fish sauce of the present invention.

The fish sauce manufactured by the method of manufacturing the fish sauce of the present invention was confirmed to have advantages that it can be manufactured in a short period, and also it has an improved flavor over the conventional fish sauce thus having a high value as a product.

Meanwhile, the fish sauce of the present invention can be generally added, without limitation, to foods containing the fish sauce such as kimchi, various kinds of seasoned vegetables, stir-fries, soups, marinated crabs, other fish sauces, etc. That is, the fish sauce of the present invention can be typically used in making kimchi, and also, the fish sauce of the present invention can be used in various kinds of seasoned vegetables and stir-fries, which constitute various side dishes.

The fish sauce of the present invention provides improved sensory desirability due to the elimination of the fishy odor intrinsic to fish sauces, improved savory taste and sweet taste, etc., compared to the conventional fish sauces, and is thus recommended for use with a broader generality rather than for limited use as a seasoning in making kimchi and other certain foods. Additionally, the fish sauce of the present invention can contribute to the development of the seafood industry and the food industry as well as to an increased income for fishermen involved in manufacture of processed fish sauces.

DETAILED DESCRIPTION OF THE PREFERRED EMBODIMENTS

The present invention will be explained in greater detail through the following examples as set forth herein below, but are disclosed for illustrative purposes only and are not to be construed as limiting the scope of the present invention.

Example 1: Manufacture of Anchovy Fish Sauce 1-1. Preparation of Raw Materials

In order to manufacture a fish sauce of the present invention, anchovies, a representative fish used in manufacturing fish sauces were used. Specifically, fresh anchovies with a size ranging from 9 cm to 13 cm caught in Goseong-gun, Gyeongsangnam-do, Korea were used.

Additionally, the meju used in manufacturing the fish sauce of the present invention was prepared as follows. First, 10 kg of soybeans were washed 2-3 times, impurities were selected, and the resultant was immersed in water for 8 hours. Following this immersion, the soybeans were drained of water and boiled via pressure cooking at 100° C. or higher for at least 60 minutes. The boiled soybeans were cooled to between 30° C. and 35° C., and the meju fungal starter (*Aspergillus oryzae*) was inoculated thereto at a concentration of between 0.1% and 1.0%. The resultant was fermented at between 25° C. and 40° C. for 48 hours to manufacture meju to be used.

1-2. Process of Manufacturing Fish Sauces

The above-purchased anchovies were washed 2 times with sea water, placed onto a net for 30 minutes to drain water, and ground to a size of from 0.5 cm to 1.0 cm. Then, the ground anchovies were added with 7.5 kg of solar salt, mixed and homogenized, added with 1.5 kg of meju, and homogenized completely.

Upon completion of homogenization, the homogenate was placed into a 50 L plastic container, and the container was covered with a lid to prevent external air from being introduced thereinto to decay, and allowed to ferment/maturate at a temperature maintained at from about 40° C. to about 50° C. by hot air current under an air conditioning system for 3 months.

Meanwhile, in order to manufacture a fish sauce of the present invention and a fish sauce to be used as a control, 30 kg of the ground anchovies were added with 7.5 kg of solar salt, and homogenized without adding meju thereto. Upon completion of homogenization, the homogenate was placed in a 50 L plastic container, and the container was covered with a lid to prevent external air from being introduced thereinto that might cause decay, and allowed to ferment/maturate at mom temperature for 12 months.

The fish sauce of the present invention and the fish sauce used as a control were fermented, and the supernatant was separated from the fermentation liquid generated during fermentation, placed thereat, and filtered. The resulting filtrate was used to manufacture a fish sauce.

Example 2: Comparison of Nutrient Contents Contained in Anchovy Fish Sauces

The nutrient components contained in the anchovy fish sauce, manufactured via rapid fermentation according to the present invention assigned as Experimental Group, and the anchovy fish sauce, manufactured via traditional fermentation assigned as Control Group, and their degree of fermentation were measured, respectively.

Specifically, the contents of total nitrogen (TN) and amino nitrogen (AN), which can serve as criteria for determining the degree of fermentation, were measured. The content of total nitrogen was measured via Kjeldahl method and the content of amino nitrogen was measured via formol titration method.

The Kjeldahl method is carried out based on the principle that a sample is added with sulfuric acid, heat-concentrated to decompose organic nitrogen, added with an alkali solution, freeing ammonium salt into $NH_3$ to be absorbed to an acidic solution, and the absorbed $NH_3$ is quantitated via titration thereby measuring the content of nitrogen.

Additionally, in the formol method, when an amino acid is maintained at about pH 9 it is equilibrated in the state of "$NH_3^+CH(R)COO^-$ (phase 1)$<=>NH_2+CH(R)COO^-+H^+$ (phase 2)". When formaldehyde is added thereto the amino acid in phase 2 reacts with formaldehyde and generates another compound, and thus the reaction proceeds with from phase 1 to phase 2 in order to maintain the equilibration, and as a result, hydrogen ions are released. Accordingly, based on the principle, the hydrogen ions released at about pH 9 are titrated with an alkali to quantitate the amino acid.

The results of measurement of total nitrogen and amino nitrogen by the Kjeldahl method and the formol method are shown in Table 1 below.

TABLE 1

Comparison of anchovy fish sauces according to fermentation methods over varied fermentation periods

| Fermentation period (month) | Total nitrogen (TN) (g/100 mL) | | Amino nitrogen (AN) (mg/100 mL) | |
|---|---|---|---|---|
| | Control Group (room temp.) | Experimental Group (meju, 45° C.) | Control Group (room temp.) | Experimental Group (meju, 45° C.) |
| 1 | 1.48 | 2.54 | 150.98 | 984.58 |
| 2 | 1.65 | 2.60 | 300.25 | 1236.00 |
| 3 | 1.78 | 2.73 | 395.78 | 1240.00 |
| 5 | 1.83 | — | 615.42 | — |
| 8 | 1.99 | — | 915 | — |
| 12 | 2.13 | — | 1092.56 | — |

As shown in Table 1, the anchovy fish sauce (experimental group), manufactured according to the method of the present invention via rapid fermentation after adding meju with high enzymatic activity, showed a rapid increase in the contents of total nitrogen and amino nitrogen compared to the anchovy fish sauce (control group), manufactured according to the conventional method.

Specifically, the anchovy fish sauce of the present invention manufactured by rapid fermentation at a constant temperature of 45° C. (experimental group) showed 2.73 (g/100 mL) of total nitrogen and 1240.00 (mg/100 mL) of amino nitrogen within 3 months after fermentation, being much higher than the anchovy fish sauce manufactured by fermenting at mom temperature for 12 months according to the conventional method (control group), which showed 2.13 (g/100 mL) of total nitrogen and 1092.56 (mg/100 mL) of amino nitrogen.

Meanwhile, the contents of total nitrogen and amino nitrogen were compared for the same period, and as a result, for example when fermented for 3 months, the anchovy fish sauce of the present invention fermented at a constant temperature (45° C.) (experimental group) showed 2.73 (g/100 mL) of total nitrogen and 1240.00 (mg/100 mL) of amino nitrogen, whereas the anchovy fish sauce manufactured by fermenting at mom temperature for 3 months according to the conventional method showed 1.78 (g/100 mL) of total nitrogen and 615.42 (mg/100 mL) of amino nitrogen, thus confirming that the anchovy fish sauce of the present invention had much higher contents.

The results imply that the method of the present invention, which includes grinding fish, adding meju thereto, and fermenting/maturating at a constant temperature, can reduce the fermentation period to half of that required for the conventional method, and furthermore, can increase the contents of total nitrogen and amino nitrogen, which are important nutrient components contained in a fish sauce during the same fermentation period, thus confirming the superior effect of the present invention and the high industrial utilization value.

Example 3: Comparison of Histamine Content Present in Anchovy Fish Sauces

Although histamine has a relatively low degree of harmfulness to human bodies, it can seriously damage health when it is taken in large amount or a natural mechanism for its metabolism is inhibited or deficient. Accordingly, it is used as a measure for food spoilage due to microorganisms. The histamine content according to fermentation/maturation of the present invention was analyzed and the results are shown in Table 2 below.

TABLE 2

Comparison of histamine content contained in anchovy fish sauce according to fermentation methods over varied fermentation periods

| Fermentation period (month) | Histamine | |
|---|---|---|
| | Control Group (room temp.) | Experimental Group (meju, 45° C.) |
| 1 | 67.79 | 39.47 |
| 2 | 66.53 | 90.32 |
| 3 | 67.79 | 102.49 |
| 5 | 150.0 | — |
| 8 | 290.6 | — |
| 12 | 433.6 | — |

As shown in Table 2, the anchovy fish sauce manufactured according to the method of the present invention by a rapid fermentation at a constant temperature after adding meju (experimental group) had a lower histamine content than that manufactured by the conventional method (control group). Specifically, the experimental group of the present invention (3 months fermentation/maturation) had a histamine content of 102.49 ppm while the anchovy fish sauce manufactured by fermenting at mom temperature for 12 months (fermentation/maturation for 12 months) according to the conventional method had a histamine content of 433.6 ppm, a four-time higher histamine content than that of the conventionally manufactured anchovy fish sauce.

As a result, it was confirmed that the method of the present invention including grinding fish, adding and mixing with meju, and fermenting/maturing at a constant temperature for 3 months can manufacture a fish sauce with a considerably lower degree of decay than that manufactured by the conventional method, thus having the advantages of a short-term manufacture and an improved quality with high industrial value.

Example 4: Sensory Test

A sensory test was performed as an evaluation regarding sensory preferences for the fish sauces manufactured as the experimental group (3 month fermentation/maturation) and the control group (12 month fermentation/maturation) as follows, in which the evaluation items included appearance preference, overall preference, flavor preference, texture preference, aftertaste preference, hot taste preference, salty taste preference, jeotgal flavor preference, savory taste preference, sweet taste preference, intensity of unpleasant taste/foul odor, etc. The sensory test was performed in 50 panels of target consumers who were actually using the products (full time housewives, female, aged between 25-40 living in Seoul and Gyeonggi Province, Korea) via 9-point scaling according to the quantitative consumer acceptance test. The results are shown in Table 3 below.

TABLE 3

Sensory Test

| Evaluation Items | Control Group | Experimental Group | p-value |
| --- | --- | --- | --- |
| Appearance preference | 6.56 | 6.70 | 0.499 |
| Overall preference | 6.12 | 6.73 | 0.015 |
| Flavor preference | 6.23 | 6.75 | 0.033 |
| Texture preference | 6.35 | 6.93 | 0.008 |
| Aftertaste preference | 6.05 | 6.61 | 0.033 |
| Jeotgal flavor preference | 6.02 | 6.02 | 0.001 |
| Hot taste preference | 6.37 | 6.75 | 0.066 |
| Salty taste preference | 5.81 | 6.64 | 0.001 |
| Sweet taste preference | 5.47 | 6.18 | 0.032 |
| Savory taste preference | 6.02 | 6.68 | 0.10 |
| Intensity of jeotgal flavor | 5.74 | 5.45 | 0.214 |
| Intensity of hot taste | 6.05 | 5.57 | 0.020 |
| Intensity of salty taste | 5.77 | 5.50 | 0.193 |
| Intensity of sweet taste | 5.91 | 5.86 | 0.864 |
| Intensity of savory taste | 5.88 | 6.00 | 0.592 |
| Intensity of unpleasant taste/foul odor | 2.12 | 1.18 | 0.011 |

* 9-point scaling (n = 50), 1 point: "much unpreferred", 5 points: "not good, not bad", 9 points: "much preferred"

Accordingly, as shown in Table 3, the fish sauce manufactured by rapid fermentation at a constant temperature after adding meju to ground fish according to the present invention showed improvements in flavor, texture, aftertaste, jeotgal flavor, salty taste, sweet taste, savory taste, intensity of unpleasant taste/foul odor, and overall preference compared to the fish sauce manufactured according to the conventional method.

Summarizing the foregoing, the quality of the fish sauce manufactured according to the present invention, although manufactured within a very short period, was not inferior to that manufactured for the conventional period, but was superior to that manufactured by the conventional method.

From the foregoing, a skilled person in the art to which the present invention pertains will be able to understand that the present invention may be embodied in other specific forms without modifying the technical concepts or essential characteristics of the present invention. In this regard, the exemplary embodiments disclosed herein are only for illustrative purposes and should not be construed as limiting the scope of the present invention. On the contrary, the present invention is intended to cover not only the exemplary embodiments but also various alternatives, modifications, equivalents and other embodiments that may be included within the spirit and scope of the present invention as defined by the appended claims.

The invention claimed is:

1. A method for manufacturing a fish sauce, comprising:
    (a) preparing a meju from soybeans which are:
        washing the soybeans in water 2-3 times,
        soaking the soybeans in water for a period of time,
        cooking the soybeans in a pressure cooker of at least 60 minutes at a temperature of 100° C. or higher,
        cooling the soybeans to 30° C. to 35° C.,
        formed into a paste from the cooled soybeans, and
        mixing the soybean paste with 0.1% to 1.0% (w/w) *Aspergillus oryzae* fungal starter, and
        fermenting the mixture for at least 48 hours at 25° C. to 40° C. to form meju;
    (b) adding salt to fish or a material derived from a fish, mixing and homogenizing, wherein the salt is added in the amount from 23% (wt. %) to 30% (wt. %) relative to the weight of the fish;
    (c) adding meju obtained from step (a) in the amount from 1% (wt. %) to 5% (wt. %) relative to the weight of the mixed homogenate obtained from step (b) and mixing them together; and
    (d) putting a mixture obtained from step (c) into a fermentation container, and fermenting and maturing it at a constant temperature for a period from 3 to 5 months,
    wherein the constant temperature in step (d) is in a range from 40° C. to 60° C.

2. The method for manufacturing a fish sauce according to claim 1, further comprising before step (b):
    (i) draining water from washed fish; and
    (ii) grinding the washed, water-drained fish or not grinding.

3. The method for manufacturing a fish sauce according to claim 2, wherein, in step (ii), the fish is ground to a size from 0.5 cm to 1.5 cm.

4. The method for manufacturing a fish sauce according to claim 1, wherein the constant temperature in step (d) is 45° C.

5. The method for manufacturing a fish sauce according to claim 1, wherein the step (d) is performed under a condition where a constant temperature is maintained in a sealed room via a hot air current or a warm air current.

6. The method for manufacturing a fish sauce according to claim 1, wherein, in step (b), the fish is selected from the group consisting of pacific sand lances, anchovies, horse mackerels, squids, octopuses, mackerel pikes, sardines, tunas, tuna cooking juice, shrimps, tiny shrimps, Japanese ice fish, herrings, gizzard shads, mackerels, *Trachurus japonicas*, *Seriola quinqueradiata*, pond smelts, and a combination thereof.

7. The method for manufacturing a fish sauce according to claim 1, further comprising (e) cooling the fish sauce manufactured in step (d) after treating it at a temperature from 60° C. to 99° C. for 30 minutes.

8. The method for manufacturing a fish sauce according to claim 1, wherein the constant temperature in step (d) is in a range from 40° C. to 50° C.

* * * * *